(12) United States Patent
Belew et al.

(10) Patent No.: US 6,944,378 B1
(45) Date of Patent: Sep. 13, 2005

(54) FIBER OPTIC MULTI-PORT ORGANIZER

(75) Inventors: Michael Shane Belew, Columbus, OH (US); Hossein Eslambolchi, Los Altos Hills, CA (US); John Sinclair Huffman, Conyers, GA (US); Lenny J Vohs, Spring Hill, KS (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/747,323

(22) Filed: Dec. 26, 2003

(51) Int. Cl.[7] ................................................. G02B 6/42
(52) U.S. Cl. ....................................................... 385/52
(58) Field of Search ............................. 385/52, 76–78, 385/139, 55, 53

(56) References Cited

U.S. PATENT DOCUMENTS

| | | | |
|---|---|---|---|
| 5,333,221 A | 7/1994 | Briggs et al. ................. | 385/55 |
| 5,751,874 A | 5/1998 | Chudoba et al. .............. | 385/72 |
| 5,796,897 A | 8/1998 | Ronan ........................... | 385/76 |
| 6,224,270 B1 | 5/2001 | Nakajima et al. ............. | 385/78 |
| 6,508,593 B1 | 1/2003 | Farnsworth et al. .......... | 385/55 |
| 6,524,014 B2 | 2/2003 | Stephenson et al. .......... | 385/55 |
| 6,579,014 B2 | 6/2003 | Melton et al. ................. | 385/76 |

Primary Examiner—Javaid H. Nasri

(57) ABSTRACT

The present invention is an apparatus and method for coupling optical fibers having disparate connectors. First and second indexing bodies are moved relative to each other to bring into alignment selected receptors for accepting the disparate connectors. Receptors for several different connectors are available on at least one of the indexing bodies. The indexing bodies may be disk-shaped and attached for rotation about a common axis, with the receptors being arranged circumferentially. The apparatus may also includes a spring clip and magnet for mounting and storing on fiber optic bays and cabinets.

22 Claims, 3 Drawing Sheets

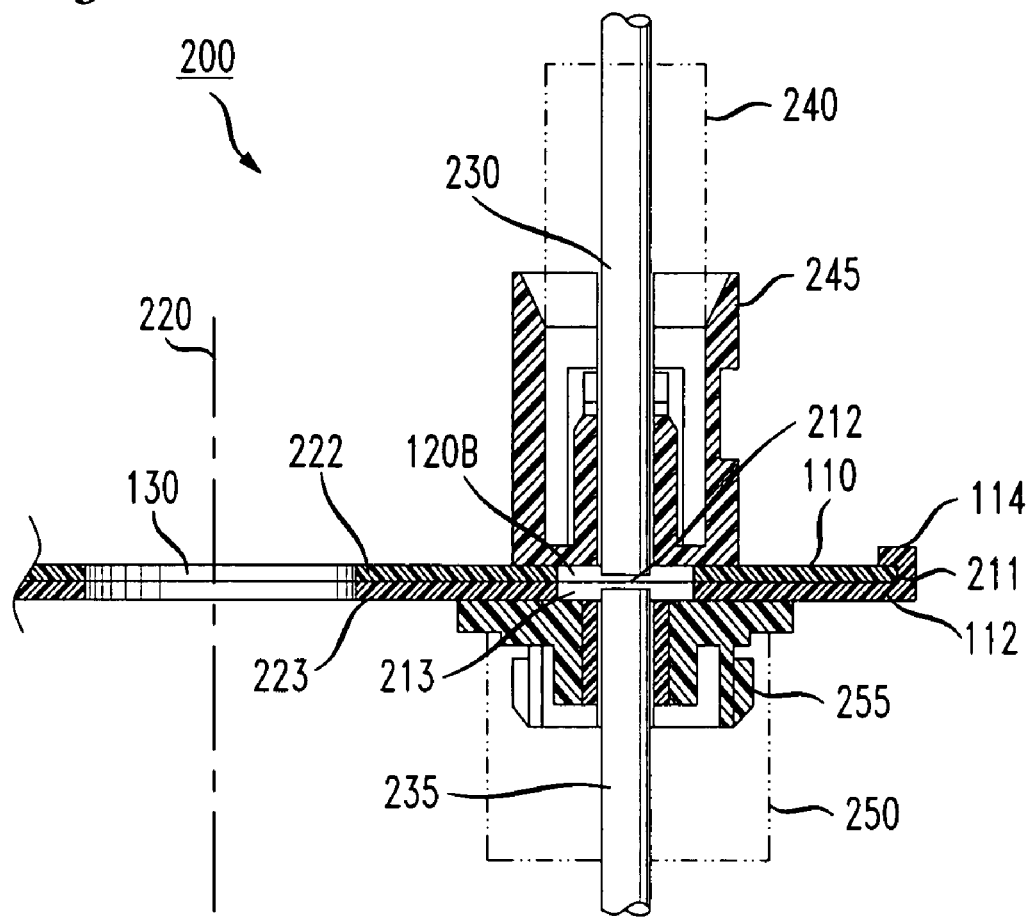
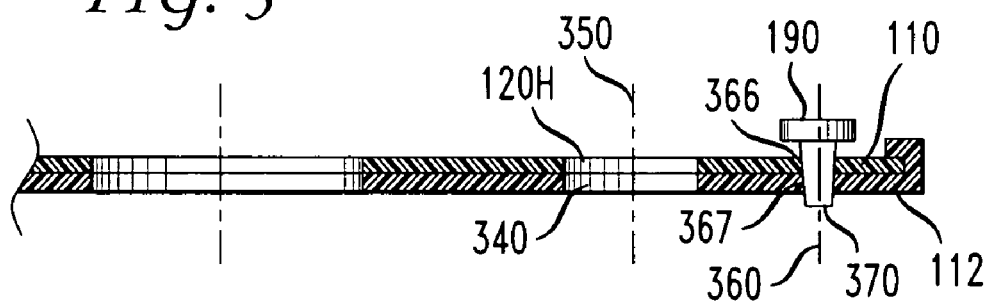

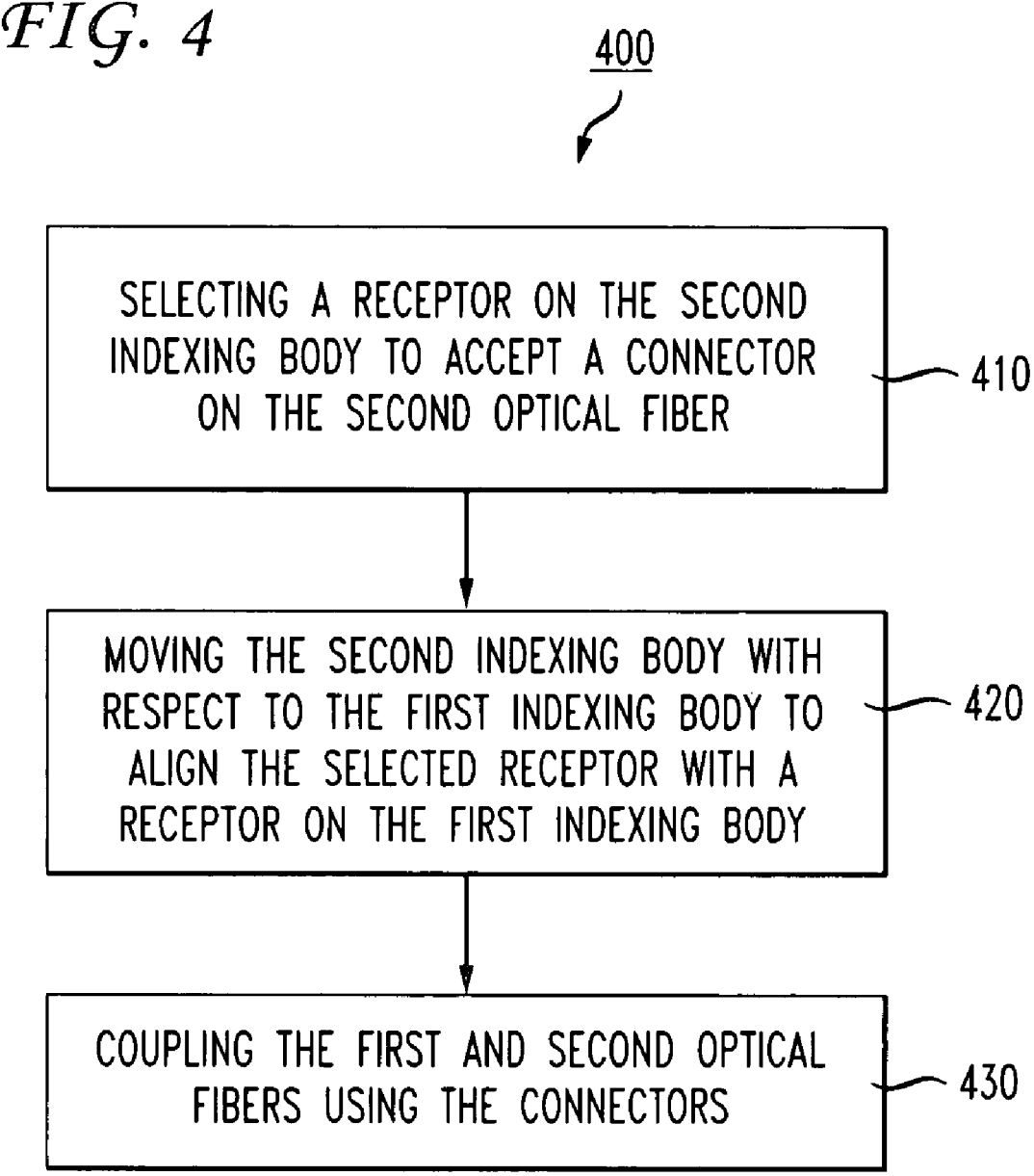

FIBER OPTIC MULTI-PORT ORGANIZER

FIELD OF THE INVENTION

The present invention relates generally to connectors for fiber optic cable, and more specifically, to making temporary test connections between jumpers and fiber optic cables in the field, where connector types are often mixed.

BACKGROUND OF THE INVENTION

Optical fiber connectors are specialized devices that must securely hold the terminal ends of optical fibers in very close coaxial alignment while maintaining an extremely small air gap between the polished ends of the fibers. Several standard connectors, or connector types, have evolved that perform that task to required specifications. Those connector types include, for example, an FC-type connector, an SC-type connector, an LC-type connector, an SCII-type connector and a biconic connector.

Over time, different optical fiber connector types have been adopted by different organizations, in different geographic areas and in different optical fiber networks. For example, FC-type connectors and STII-type connectors have been generally been adopted by AT&T corporation as its standard fiber optic connectors. As networks and organizations have been consolidated, however, situations are created where terminal facilities and other fiber optic cable facilities contain a mixture of different connector types. Further, technicians that are equipped to work on facilities containing one type of connector are frequently called upon to service facilities containing equipment based on a different type of connector.

Connector compatibility presents the greatest problems in situations where temporary connections between fibers must be made quickly. While in planned servicing and new installations special connector adapters can be made up ahead-of-time, that is not the case in emergency service restoration, such as in the case of a cable cut in the field. There have been many instances where service restoration was severely delayed because fiber jumpers that were on hand were incompatible with connectors that were in place in the network. Work in those cases had to be stopped until a special adapter was either made up or shipped in from another location.

Similar situations arise in field work where a fiber must be patched from one route to another, or where testing is performed using jumpers. A technician typically does not have in her possession an adapter for each and every connector combination that she may encounter on a typical job, and the job is frequently delayed because of that.

A modern permanent long-run fiber to fiber connection may require less than 0.1 dB power loss, and some applications even require less than 0.01 dB. That, however, is not the case in the testing and temporary patching that is frequently done on emergency fiber optic cable maintenance. In those cases, a 0.5 dB loss may be acceptable, at least for a temporary connection.

Attempts have been made to provide a universal fiber optic connector. In U.S. Pat. No. 6,224,270 to Nakajima et al., issued May 1, 2001, an adapter includes a ferrule that is spring-biased axially away from a snap-in plug. That portion of the adapter is installed on every fiber end. For each type of connector encountered, a special plug housing is provided that is compatible with the snap-in plug.

U.S. Pat. No. 6,508,593 to Farnsworth et al., issued Jan. 21, 2003, discloses a universal panel-mount system. In that system, a universal receptacle housing is mounted in an opening in the panel. A set of differently configured fiber optic adapters are specially designed to accept standard fiber optic connectors. Those adapters are configured to fit in the universal receptacle housing.

U.S. Pat. No. 5,333,221 to Briggs et al., issued Jul. 26, 1994, describes a universal fiber optic cable adapter that accepts diverse back panel assemblies that differ according to industry connector standards.

In each of those systems, it is necessary for a technician to have on hand a separate adapter for each connector type encountered. As noted, it is frequently the case that such an adapter is not at the site. Complications in procuring such an adapter are a major cause of delays in restoring telecommunications service after cable cut events.

Often, where temporary connections are made to restore service, fiber optic jumpers are used. In cases where cables with different connectors must be joined, the jumper itself may be the adapter having different connectors on the ends. Technicians often drape the jumper over a cabinet door, drape it over the equipment being used, or simply let it hang down from the bay. Such treatment could cause attenuations during testing or could damage the cable or the cabinet connection if the cable is dropped, bumped or snagged.

There is therefore presently a need for a method and apparatus for optically coupling fiber ends having disparate connectors, in a quick and efficient manner, without delay caused by procuring a special adapter. There is further a need for a device that safely positions the jumpers and cables being worked on during a restoration or other service. To the inventors' knowledge, there is no such apparatus or method currently employed to satisfactorily accomplish that task.

SUMMARY OF THE INVENTION

The present invention addresses the needs described above by providing an apparatus and method for optically coupling fiber ends. In accordance with one embodiment of the invention, an apparatus includes a first indexing body having at least one receptor for receiving an optical fiber connector. The apparatus further has a second indexing body disposed in moveable contact with the first indexing body. The second indexing body has a plurality of receptors for receiving optical fiber connectors, at least two of said receptors being for receiving different types of optical fiber connectors. The first and second indexing bodies are relatively moveable to selectively align one of the receptors on the first indexing body with one of the receptors on the second indexing body.

At least one of the first and second indexing bodies may disk-shaped. The second indexing body may be rotatable with respect to said first indexing body.

The receptors on the second indexing body may be circumferentially spaced around an axis of rotation of the second indexing body. In that case, the first and second bodies may be disk-shaped, and the first and second bodies may have substantially flat surfaces that are in sliding contact. The apparatus may include a detent for fixing the first indexing body with respect to the second indexing body at a position where the first and second receptors are aligned.

The apparatus may comprise optical fibers disposed in connectors received by the aligned receptors, wherein respective ends of the optical fibers are facing one another. In that case, respective ends of the optical fibers may be substantially aligned. Further, a gap between respective ends of the optical fibers may be less than 0.004 inches.

The receptors of the second indexing body may include two receptors for accepting two different types of optical fiber connectors selected from a group consisting of an FC-type connector, an SC-type connector, an LC-type connector, a biconic-type connector and an STII-type connector.

The apparatus may include a clip for attaching the first and second bodies to a fiber optic distribution bay. The clip may be a spring tensioned gripper, or may be a magnet.

In another embodiment of the invention, a method is provided for optically coupling first and second optical fibers fitted with connectors, using an apparatus with first and second indexing bodies. The method includes the step of selecting a receptor from a plurality of receptors on the second indexing body. The receptor is selected to accept a connector on the second optical fiber. The method also includes the step of moving the second indexing body with respect to the first indexing body to align the selected receptor on the second indexing body with a receptor on the first indexing body. Finally, the first and second optical fibers are coupled using the connectors.

The method may also include the step of selecting a receptor from a plurality of receptors on the first indexing body. That receptor is selected to accept a connector on the first optical fiber. In that case, the step of moving the second indexing body with respect to the first indexing body is for the purpose of aligning the selected receptor on the second indexing body with the selected receptor on the first indexing body.

The step of moving the second indexing body with respect to the first indexing body may include rotating the second indexing body with respect to the first indexing body. In that case, the plurality of receptors on the second indexing body may be arranged circumferentially around an axis of rotation of the second indexing body, and the rotating step may sequentially bring the plurality of receptors on the second indexing body into alignment with the receptor on the first indexing body.

The step of coupling the first and second optical fibers using the connectors may include aligning ends of the first and second optical fibers. The step of coupling the first and second optical fibers using the connectors may include bringing ends of the first and second optical fibers into proximity to form a gap less than 0.004 inches.

The receptor selected from the plurality of receptors on the second indexing body may be of a different type from the receptor on the first indexing body.

The method may also include the step of fixing the first and second indexing bodies to a fiber optic distribution bay. Relative movement may be locked between the first indexing body and the second indexing body.

BRIEF DESCRIPTION OF THE DRAWINGS

FIG. 2 is a sectional view of the apparatus of FIG. 1 through section II—II, according to one embodiment of the invention.

FIG. 3 is a sectional view of the apparatus of FIG. 1 through section III—III, according to one embodiment of the invention.

FIG. 4 is a block diagram showing a method for optically coupling fiber ends according to one embodiment of the invention.

DESCRIPTION OF THE INVENTION

Figure 1:
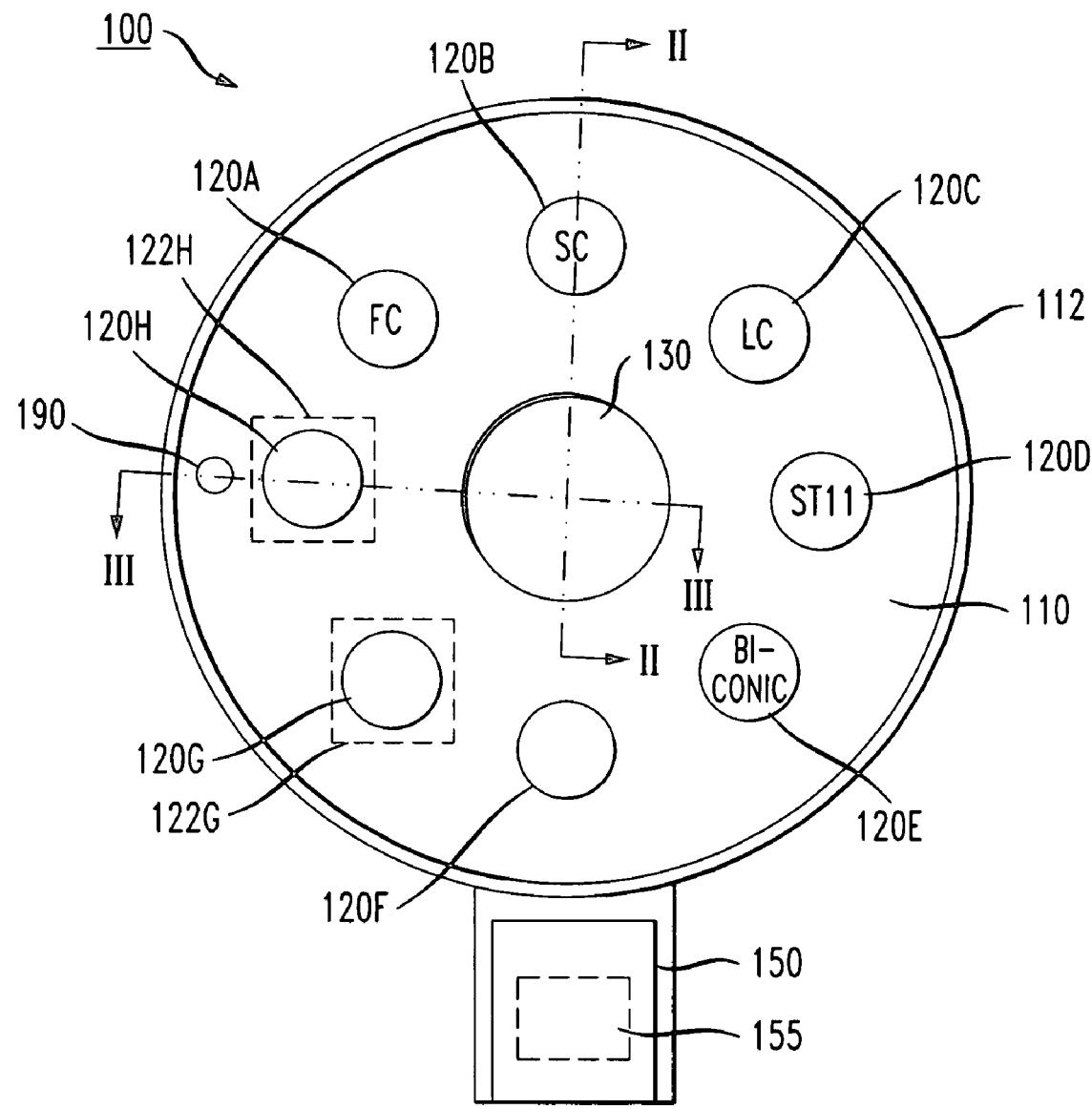
FIG. 1 is a plan view of an apparatus for optically coupling fiber ends, according to one embodiment of the invention.

A fiber optic multi-port organizer 100 according to the present invention is shown in FIG. 1. As described in detail below, the organizer has a number of optical fiber connector receptors on a pair of relatively moveable indexing bodies. The indexing bodies are moved with respect to each other to line up a desired pair of receptors to connect two optical fibers having arbitrary connectors.

The organizer 100 includes a first indexing body 112 in moveable contact with a second indexing body 110. In the embodiment shown, the indexing bodies 110, 112 are disk-shaped, and are rotatably connected to each other. For that purpose, the first indexing body 112 is provided with a lip 114 that surrounds the second indexing body 110. The lip 114 includes an overhanging retaining surface, as discussed with respect to FIG. 2, to retain and guide the second indexing body.

The first and/or the second indexing body may have a central hole 130. The central hole may provide an additional bearing area for attaching and guiding relative movement between the first and second indexing bodies. For example, a central shaft or an integral bearing surface (not shown) may be provided to guide the disks relative to each other.

The first and second indexing bodies 112, 110 are preferably constructed from a thermoplastic resin material having good dimensional stability, such as nylon resin. For additional stability, the resin may be reinforced with glass fibers or other means as is known in the art. One skilled in the art will recognize that ribs, variable wall thicknesses and other design features may be added to the features shown in the drawings to enhance strength, rigidity and dimensional stability, without departing from the invention.

In the illustrated embodiment, the first indexing body 112 is provided with a spring tensioned gripper 150 that allows the device 100 to be attached to cabinet doors or other fixed points in a distribution bay. On the back of the spring tensioned gripper 150 is a magnet 155 that also allows the device to be conveniently placed on various surfaces typically found in the vicinity of a fiber connection bay, such as steel enclosures.

The magnet 155 and spring tensioned gripper 150 may be used to fix the device of the invention in a work area while it is being used, eliminating the need to drape jumpers over cabinet doors and enclosures, and curtailing hanging jumpers. The magnet and gripper may also be used to store the device of the invention in an enclosure or a bay so that it is available to a technician.

The second indexing body 110 is provided with a number of positions 120A–120H where optical fiber connector receptors are attached. The positions 120A–120H include holes in the second indexing body to allow an optical fiber end to be presented to another optical fiber end in a precise location and orientation, as described below. The positions are designated for receiving receptors that accept standard optical fiber connectors. While the device of the invention is illustrated with 8 positions, more or fewer positions may be incorporated without departing from the scope of the invention.

The term "receptor," as used herein, means a component that receives an optical fiber connector. A receptor may be a jack housing, a plug assembly and may be a male or female configuration. A receptor accepts one or more standard or non-standard optical fiber connectors with which the device of the present invention will work.

In the embodiment of FIG. 1, several exemplary receptors are labeled at locations on the second indexing member 110.

The actual receptors are not shown in FIG. 1. A receptor for an FC-type connector is placed at position 120A. A receptor for an SC-type connector is placed at position 120B. An SC-type connector has a rectangular outer shape, and the hole provided for that receptor may be either round, as shown at position 120A, or may be a square hole such as holes 122H and 122G.

The receptor itself is preferably bonded to the second indexing body, using a suitable adhesive, by solvent welding or by sonic welding. Alternatively, the receptor may be molded as an integral part of the second indexing member 110.

Other exemplary receptors included in the embodiment shown in FIG. 1 are a receptor for an LC-type connector at position 120C, a receptor for an STII-type connector at position 120D and a receptor for a biconic-type connector at position 120E. As noted, the receptors may be either plugs or receptacles of the designated type. Positions 120F, 120G and 120H are shown vacant. In one embodiment of the invention, those positions contain receptors of types already described in reference to positions 120A–120E, but of opposite male/female configuration.

The first indexing body 110 may also have a plurality of positions with a plurality of receptors (not shown), or may have a single receptor placed at a single location. For example, if a technician works only with FC jumpers, then the second indexing body may contain only a single receptor that receives FC-type connectors. The second indexing body could then be rotated to provide any combination of an FC-type connector with the connectors received by the receptors on the second indexing body.

In another embodiment, the second indexing body has n receptors and the first indexing body has m receptors. In that case, the device of the invention would be capable of coupling n times m possible combinations of connectors by indexing selected receptors on the first and second indexing bodies into alignment.

FIG. 2 is a sectional view of a device 200 according to one embodiment of the invention, taken at line II—II shown in FIG. 1. Like elements are identified using like element numbers. The two indexing bodies 110, 112 are shown in section, each rotatable about an axis of rotation 220 through the central hole 130. The first indexing body 112 has lip 114 that surrounds and captures an outer edge 211 of the second indexing member 110. Circumferential gaps and lead-in chamfers (not shown) in the lip 114 may be provided for assembling the first and second indexing members, or the lip 114 may be a separate component that is assembled to the first indexing body 112 after the second indexing body 110 is in place.

In the view shown in FIG. 2, the hole at position 120B on the second indexing body 110 has been aligned with a hole at position 213 in the first indexing body 112. In alignment with the hole at position 120B, and fixed to the second indexing body 110 as described above, is a receptor 245 for accepting an SC-type connector 240. The connector 240 is shown in phantom to simplify the view. The connector 240 and receptor 245 maintain an optical fiber end 230 at a precise position and orientation with respect to the device 200. The end face of the optical fiber 230 is maintained at an axial position proximate a plane of a sliding surface 223 of the second indexing body 110.

Aligned with the hole 213 in the first indexing body 112 is a receptor 255 for accepting an FC-type optical fiber connector 250, also shown in phantom. Those elements cooperate to precisely align and position an optical fiber end 235. The axial position of the end surface of fiber 235 is maintained proximate a plane of a sliding surface 222 of the first indexing body 112.

A small air gap 212 is created between the optical fiber end 230 and the optical fiber end 235. That air gap may need to be less than 10 microns (0.0004 inches) in order to avoid large power losses in the connection. To minimize the air gap, both the position and the angular alignment of the components described above must be maintained at relatively close tolerances. It is noted, however, that some leeway exists in those tolerances because the presently described device is generally used for testing and to create a temporary, restorative connection. In those cases, a 100 micron gap (0.004 inches) is tolerable.

It can be seen from the sectional view of FIG. 2 that other receptors for other types of fiber optic connectors could be installed on the indexing bodies 110, 112, and used in conjunction with the receptors on the opposite indexing body. The receptors must be assembled on the indexing bodies 110, 112 so as to axially position the end surface of the optical fiber proximate the sliding surface of the indexing body, so that the air gap 212 between the fiber end surfaces is maintained.

The device of the invention may be provided with an indexing detent for fixing the first and second indexing bodies at a precise rotational position. In that way, the optical fiber end surfaces are precisely aligned within the holes in the indexing bodies, and the surface area of the fiber-to-fiber interface is maximized.

One such detent is illustrated in FIG. 3, which is a sectional view taken at line III—III of FIG. 1. In that embodiment, a tapered alignment hole 366 is provided in the second indexing body 110, accurately placed with respect to position 120H. Another tapered alignment hole 367 is provided in the body 112, accurately placed with respect to the position 340. A tapered alignment pin 370 having a knurled head 190 is placed simultaneously in the holes 366, 367, aligning the centerlines 360 of those holes, and thereby aligning the centerlines 350 of the positions 120H, 340. One of the indexing bodies has a single alignment hole, the other has one alignment hole for each receptor position.

Alternate detent arrangements may be used. For example, a spring-loaded ball plunger (not shown) in one of the indexing bodies may be placed in alignment with a series of circumferentially spaced notches or holes in the other indexing body, stopping relative rotation of the indexing bodies as each pair of receptors is aligned. One skilled in the art will recognize that other arrangements may be used.

A method 400 according to the invention for optically coupling first and second optical fibers fitted with connectors is shown in FIG. 4. The method uses an apparatus that includes first and second indexing bodies, as described above. In the method, a receptor is selected (step 410) from a plurality of receptors on the second indexing body. The receptor is selected to accept a connector on the second optical fiber. For example, in the embodiment described above, an SC receptor may be selected to accept an SC connector on one of the optical fibers to be coupled.

The second indexing body is then moved (step 420) with respect to the first indexing body to align the selected receptor on the second indexing body with a receptor on the first indexing body. If the first indexing body contains only one receptor, the selected receptor is aligned with that receptor. If the first indexing body contains a plurality of receptors, however, one of those must also be selected to accept a connector on the first optical fiber. In that case, the two selected receptors are aligned. As discussed above, a detent may be used to assist in aligning the receptors. In an alternative method, the receptors are roughly aligned, and the indexing bodies are then moved to finely adjust the alignment of the receptors while observing a readout of the transmitted power. The receptors are aligned when the transmitted power is maximized.

The first and second optical fibers are then coupled (step 430) using the connectors. The connectors are inserted into the receptors as they would be inserted into standard connectors of matching type.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein as a disk-shaped arrangement with rotational relative movement between the first and second indexing bodies, the method and apparatus of the invention may instead utilize other geometric arrangements for selectively aligning the receptors. For example, the first indexing body may move in a linear fashion with respect to the second indexing body, and the receptors may be arranged in a straight line. It is to be understood that the embodiments shown and described herein are only illustrative of the principles of the present invention and that various modifications may be implemented by those skilled in the art without departing from the scope and spirit of the invention.

What is claimed is:

1. An apparatus for optically coupling fiber ends, the apparatus comprising:
    a first indexing body having at least one receptor for receiving an optical fiber connector;
    a second indexing body disposed in moveable contact with the first indexing body, the second indexing body having a plurality of receptors for receiving optical fiber connectors, at least two of said receptors being for receiving different types of optical fiber connectors;
    said first and second indexing bodies being relatively moveable to selectively align one of the receptors on the first indexing body with one of the receptors on the second indexing body.

2. The apparatus of claim 1, wherein at least one of the first and second indexing bodies is disk-shaped.

3. The apparatus of claim 1, wherein said second indexing body is rotatable with respect to said first indexing body.

4. The apparatus of claim 3, wherein the receptors on the second indexing body are circumferentially spaced around an axis of rotation of the second indexing body.

5. The apparatus of claim 4, wherein the first and second bodies are disk-shaped, the first body comprising a first substantially flat surface, the second body comprising a second substantially flat surface, the first and second substantially flat surfaces being in sliding contact.

6. The apparatus of claim 1, further comprising a detent for fixing the first indexing body with respect to the second indexing body at a position where the first and second receptors are aligned.

7. The apparatus of claim 1, further comprising optical fibers disposed in connectors received by the aligned receptors, wherein respective ends of the optical fibers are facing one another.

8. The apparatus of claim 7, further wherein respective ends of the optical fibers are substantially aligned.

9. The apparatus of claim 7, further wherein a gap between respective ends of the optical fibers is less than 0.004 inches.

10. The apparatus of claim 1, wherein the receptors of the second indexing body include two receptors for accepting two different types of optical fiber connectors selected from a group consisting of an FC-type connector, an SC-type connector, an LC-type connector, a biconic-type connector and an STII-type connector.

11. The apparatus of claim 1, further comprising a clip for attaching the first and second bodies to a fiber optic distribution bay.

12. The apparatus of claim 11, wherein the clip is a spring tensioned gripper.

13. The apparatus of claim 11, wherein the clip further comprises a magnet.

14. A method for optically coupling first and second optical fibers fitted with connectors, using an apparatus with first and second indexing bodies, the method comprising the steps of:
    selecting a receptor from a plurality of receptors on the second indexing body, the receptor being selected to accept a connector on the second optical fiber;
    moving the second indexing body with respect to the first indexing body to align the selected receptor on the second indexing body with a receptor on the first indexing body; and
    coupling the first and second optical fibers using the connectors.

15. The method of claim 14, further comprising the step of:
    selecting a receptor from a plurality of receptors on the first indexing body, the receptor being selected to accept a connector on the first optical fiber;
    wherein the step of moving the second indexing body with respect to the first indexing body is to align the selected receptor on the second indexing body with the selected receptor on the first indexing body.

16. The method of claim 14, wherein the step of moving the second indexing body with respect to the first indexing body comprises rotating the second indexing body with respect to the first indexing body.

17. The method of claim 16, wherein said plurality of receptors on the second indexing body are arranged circumferentially around an axis of rotation of the second indexing body, said rotating step sequentially bringing the plurality of receptors on the second indexing body into alignment with the receptor on the first indexing body.

18. The method of claim 14, wherein the step of coupling the first and second optical fibers using the connectors includes aligning ends of the first and second optical fibers.

19. The method of claim 14, wherein the step of coupling the first and second optical fibers using the connectors includes bringing ends of the first and second optical fibers into proximity to form a gap less than 0.004 inches.

20. The method of claim 14, wherein the receptor selected from the plurality of receptors on the second indexing body is of a different type from the receptor on the first indexing body.

21. The method of claim 14, further comprising the step of fixing the first and second indexing bodies to a fiber optic distribution bay.

22. The method of claim 14, further comprising the step of locking relative movement between the first indexing body and the second indexing body.

* * * * *